J. P. TOSTEVIN.
Wheel Cultivator.
No. 50,052. Patented Sept. 19, 1865.
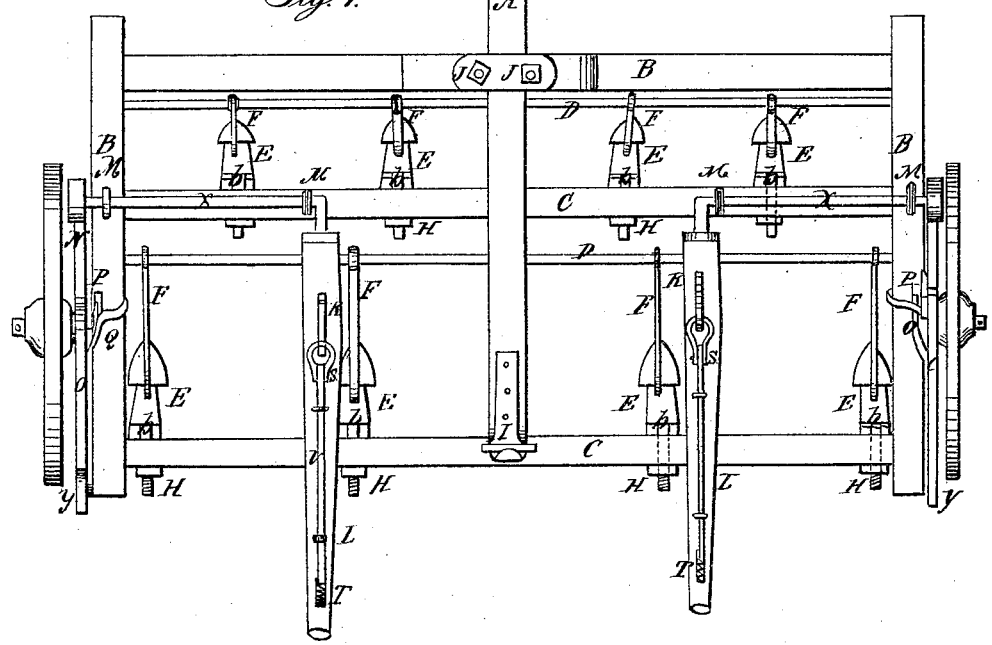

UNITED STATES PATENT OFFICE.

JAMES P. TOSTEVIN, OF RACINE, WISCONSIN.

IMPROVEMENT IN CULTIVATORS.

Specification forming part of Letters Patent No. 50,052, dated September 19, 1865.

*To all whom it may concern:*

Be it known that I, JAMES P. TOSTEVIN, of Racine, in the county of Racine and State of Wisconsin, have made a new and useful Improvement in Cultivators; and I do hereby declare that the following is a full, clear, and exact description of the same, reference being had to the accompanying drawings and letters of reference marked thereon, which form a part of this specification, and in which—

Figure 1 represents a top or plan view of my improved cultivator; Fig. 2, an end elevation; Fig. 3, a detached view of one of the cross-pieces, marked C, in Fig. 1; Fig. 4, a detached sectional view of that part of the frame of the cultivator to which the tongue is attached, showing the method of attachment; and Fig. 5 is a separate view of the cogged sectors, marked O O, in Figs. 1 and 2.

The nature of my invention consists in a novel device for raising and lowering the plows to any required height; also, in a novel method ot attaching the plow-standards to the cultivator-frame, and of attaching the tongue to the frame of the machine.

To enable those skilled in the art to manufacture and use my invention, I will proceed to describe the same with particularity.

The same letters of reference represent corresponding parts in the various figures.

A represents the tongue of my cultivator; B, the frame; and C C, two cross-pieces, extending from side to side of said frame.

D D are rods extending across the cultivator.

E represents the plow-standards, and F braces bracing them. The upper ends of the braces F are not attached rigidly to the rods D, but are looped around them in such a manner as to admit of their being slipped laterally thereon. The tops of the plow-standards E have slots cut into them, as shown at *b*, and they are fastened to the sides of the cross-pieces C by means of T-bolts H, the said bolts passing through the slots *a*, (shown in Fig. 3) in the said cross-pieces.

The slots *b* in the tops of the plow-standards enable the operator to remove and attach the standards by simply loosening and tightening the nuts on the bolts H, and the slots *a* enable him to move the plow-standards laterally, thereby adjusting the relative position of the plows to adapt them to various kinds of work by simply moving the bolts H in said slots and sliding the braces F on the rods D.

The tongue A is so attached to the cross-piece C at I as to admit of a vertical motion of the front end of the tongue without moving the cultivator-frame, and it is attached to the frame of the cultivator by means of the set-screw K and the bolts J J in such a manner that the operator is able to raise or lower the front end of the tongue by turning the set-screw K and the nuts on the bolts J J, and thereby change the pitch or inclination of the plows as different kinds of work may require.

L L are levers, and are attached to the shafts X X. These shafts have bearings at M M, and are rigidly attached to the cogged sectors N N. O O are also cogged sectors, and revolve on spindles attached to the frame of the machine at Y Y. The spindles on which the wheels of the cultivator revolve are attached to the sectors O O, as shown. Then, by raising and lowering the levers L L, the shafts X X are turned, which, through the instrumentality of the cogged sectors N N, vibrates the cogged sectors O O, and thus raises or lowers the frame of the cultivator. There is a catch, Q, attached to the inside of the sector O, which extends behind the guide P, and when the sector is vibrated the said catch slides up or down behind the guide. The guide P being firmly attached to the cultivator-frame, this device strengthens the sector O and keeps it from swinging out from the frame. There is a sliding rod, U, on the lever L, which has one end bent and put through a slot in the said lever. There is also in this slot a spring, T, which presses the said rod forward. The other end of said rod falls into notches on the standard R and keeps the lever L at any required height. There is a joint, S, near one end of U, so that when the operator wishes to raise the cultivator-frame he simply bears down on the levers L, when the joint S allows the end of the rod U to fall into the notches on the standard R, like a pawl; but to raise the levers the operator must take hold of the end of the rod U and draw it back by compressing the spring T, which draws the other end of the rod out of the notches in the standard R, when the lever can be raised to any required height.

By having two levers either side of the cultivator-frame can be raised or lowered independent of the other.

My cultivator can be used for plowing the entire surface of the ground in preparing it for seed, or, by certain adjustment of the plows, it can be used for cultivating between rows.

Having fully described the construction and operation of my improved cultivator, what I claim as my invention, and desire to secure by Letters Patent, is—

1. The combination and arrangement of the tongue A, when extending back and joined to the cross-piece C, substantially as shown, the bolts J J, the set-screw K, and frame B, when constructed and operating substantially as and for the purposes set forth.

2. The combination and arrangement of the cross-piece C, provided with the slot a, the T-bolt H, plow-standard E, provided with the slot b, brace F, and rod D, when operating substantially as described.

3. The combination and arrangement of the cogged sectors N and O with the wheel and frame of the cultivator, when operating substantially as herein specified.

4. The combination and arrangement of the lever L, slide-rod U, notched standard R, shaft X, and sector N, when constructed and operating substantially as and for the purposes herein set forth.

JAMES P. TOSTEVIN.

Witnesses:
L. L. COBURN,
W. E. MARRS.